United States Patent [19]

Hibner et al.

[11] Patent Number: 5,046,178
[45] Date of Patent: Sep. 3, 1991

[54] CONTROL METHOD FOR AUTOMATIC TRANSMISSION GARAGE SHIFTS

[75] Inventors: John A. Hibner, Coldwater, Ohio; Carl A. Lentz, Mooresville, Ind.

[73] Assignee: General Motors Corporation, Detroit, Mich.

[21] Appl. No.: 464,055

[22] Filed: Jan. 11, 1990

[51] Int. Cl.⁵ .............................................. B60K 41/18
[52] U.S. Cl. .................................... 364/424.1; 74/866
[58] Field of Search .............. 364/424.1; 74/866, 867; 192/0.052

[56] References Cited

U.S. PATENT DOCUMENTS

| | | | |
|---|---|---|---|
| 4,843,922 | 7/1989 | Kashihara | 74/866 |
| 4,855,913 | 8/1989 | Brekkestran et al. | 364/424.1 |
| 4,875,391 | 10/1989 | Leising et al. | 74/866 |
| 4,893,527 | 1/1990 | Furusawa et al. | 74/866 |
| 4,930,080 | 5/1990 | Suzuki | 364/424.1 |
| 4,951,200 | 8/1990 | Leising et al. | 364/424.1 |
| 4,955,256 | 9/1990 | Kashihara et al. | 74/866 |

Primary Examiner—Salvatore Cangialosi
Attorney, Agent, or Firm—Mark A. Navarre

[57] ABSTRACT

Garage shifts are accomplished at shifts from neutral to forward or reverse or between forward and reverse. An off-going clutch is released at the beginning of the shift for shifts between forward and reverse; shifts from neutral have no off-going clutch. The on-coming clutch has a fill time at maximum pressure, a lower increasing pressure ramp to begin engagement as indicated by pullup or pulldown, and a closed-loop control triggered by pullup or pulldown. The closed-loop control commands the pressure to control the turbine speed to a calculated profile to bring the speed to a target value. When the target value is attained the closed-loop control is terminated and maximum pressure is applied. For low speed shifts and for a high speed shift between forward and reverse, the target value is zero. For high speed shifts from neutral the target value may be either above or below the initial turbine speed.

7 Claims, 11 Drawing Sheets

FIG. 1a

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |
| NEUT | | | | | X |

CONTROL METHOD FOR AUTOMATIC TRANSMISSION GARAGE SHIFTS

FIELD OF THE INVENTION

This invention relates to a method of controlling garage shifts in an automatic transmission, and more particularly, for shifts at or near zero speed, for shifts from neutral and for directional change shifts.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio. Garage shifts require shifting from neutral to forward or reverse, or shifting between forward and reverse. When shifting from neutral, no off-going clutch is employed but an on-coming clutch is applied. For other garage shifts, a clutch is released and another is applied in a controlled manner.

The speed ratio is defined as the transmission input speed or turbine speed divided by the output speed. Thus, a low gear range has a high speed ratio and a higher gear range has a lower speed ratio. To perform an upshift, for example, a shift is made from a high speed ratio to a low speed ratio. In the type of transmission involved in this invention, the upshift is accomplished by disengaging a clutch associated with the higher speed ratio and engaging a clutch associated with the lower speed ratio to thereby reconfigure the gear set to operate at the lower speed ratio.

As used herein, the term "garage shifts" encompasses shifts at or near zero output speed including shifts from neutral and shifts between forward and reverse (direction changing shifts). Garage shifts also include relatively high speed shifts from neutral and direction changing shifts. Output speeds above 60 RPM are considered to be "high speeds" and garage shifts above a calibrated limit speed, such as 100 RPM are not permitted Although a wide variety of shift conditions are encountered in this group of shift types, it is desirable to consolidate them for management by a single control program with a minimum of special provisions for special cases.

SUMMARY OF THE INVENTION

It is therefore an object of the invention to provide a method of controlling shifts from neutral or direction changing shifts at both low and high speeds.

The method is carried out by immediately releasing the off-going clutch (none required for shifts from neutral) and controlling the on-coming clutch pressure to quickly and smoothly control the turbine speed to a target value which completes the shift. The target value is zero for low speed shifts and for direction changing shifts, and turbine speed pulldown signifies the beginning of engagement of the on-coming clutch. For high speed shifts from neutral, the target value is dependent on the output speed and may be either higher or lower than the initial turbine speed and turbine speed pullup or pulldown may signal beginning engagement. A closed-loop control period is triggered at the time of beginning engagement. A turbine speed profile is established to guide the turbine speed from its value at the beginning of the closed-loop period to its target value at the end of that period.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish neutral and the various speed ratios of the transmission depicted in FIG. 1a.

DETAILED DESCRIPTION OF THE INVENTION

Figure 1A:
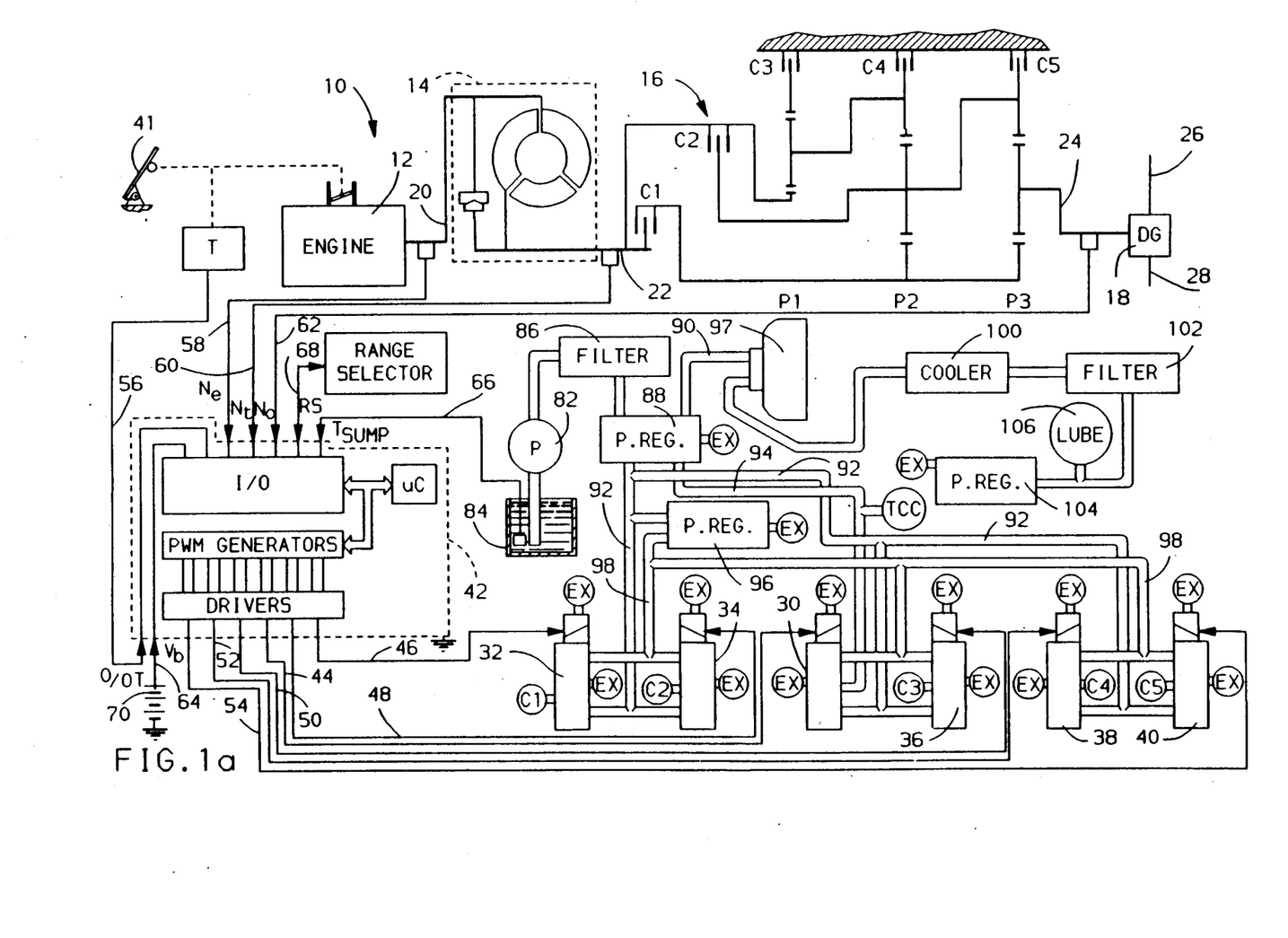
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gear set is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

Figure 1B:
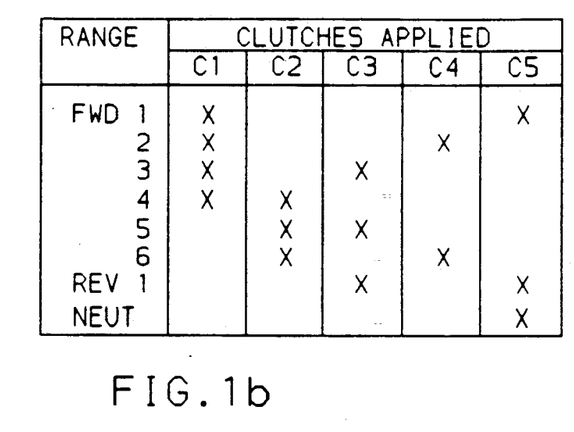

The speed and torque relationships between the engine 12 and the drive wheels of the vehicle are controlled by a fluid operated torque converter clutch, designated TCC, and five fluid operated transmission clutches, designated C1-C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio or neutral. It will be noted that in neutral, the clutch C5 is engaged so that a shift can be made to reverse or the first forward range by applying clutch C3 or clutch C1, respectively. It is also apparent that a shift between forward and reverse requires only a release of one clutch and the application of one clutch. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/0) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lockup mode.

FIGS. 2, 3a-3b, 7, 8, 9 and 10a-10b are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

Figure 2:
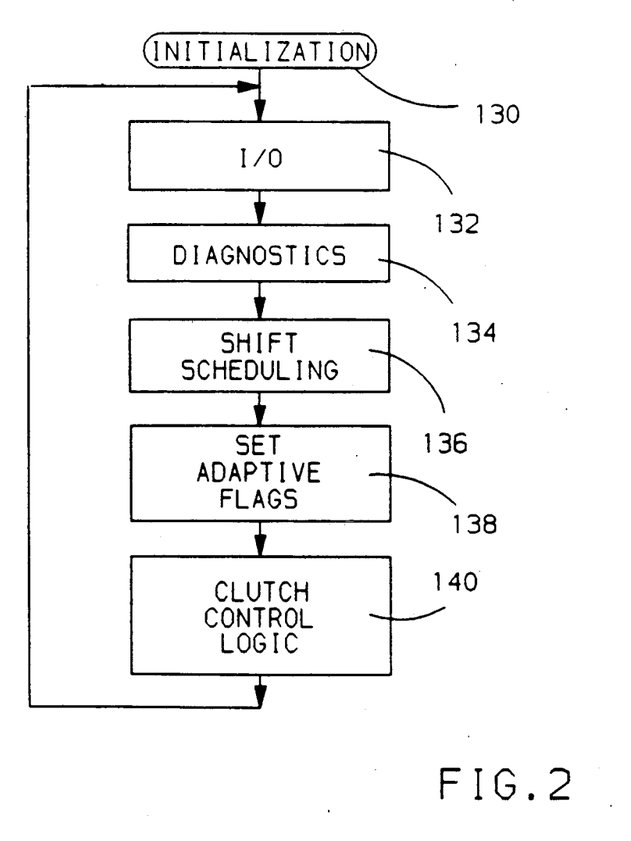
FIGS. 2 and 3a-3b are flow diagrams representative of computer program instructions executed by the computer-based controller of FIG. 1a in carrying out the shift control of the transmission.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
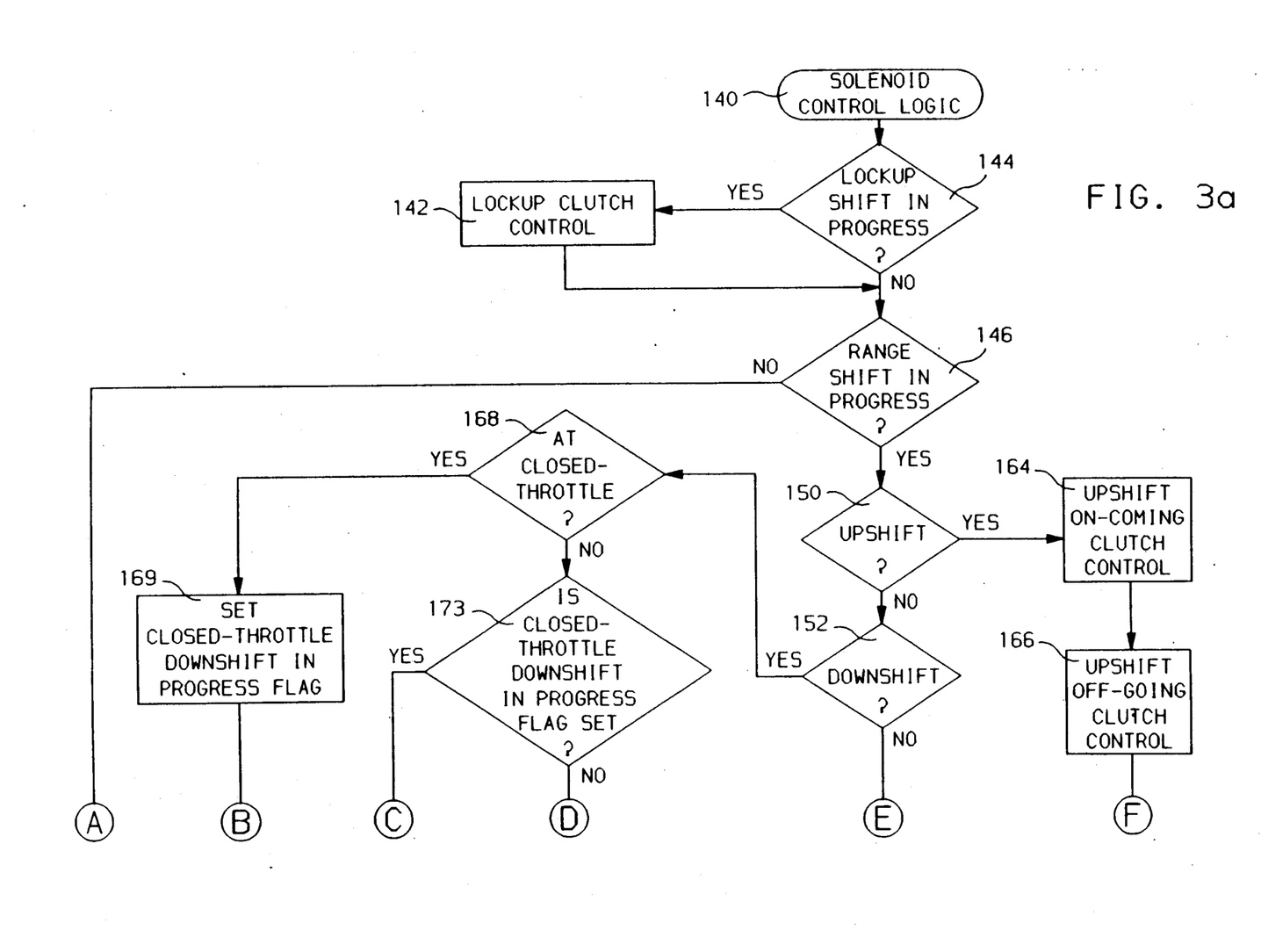
Figure 3B:
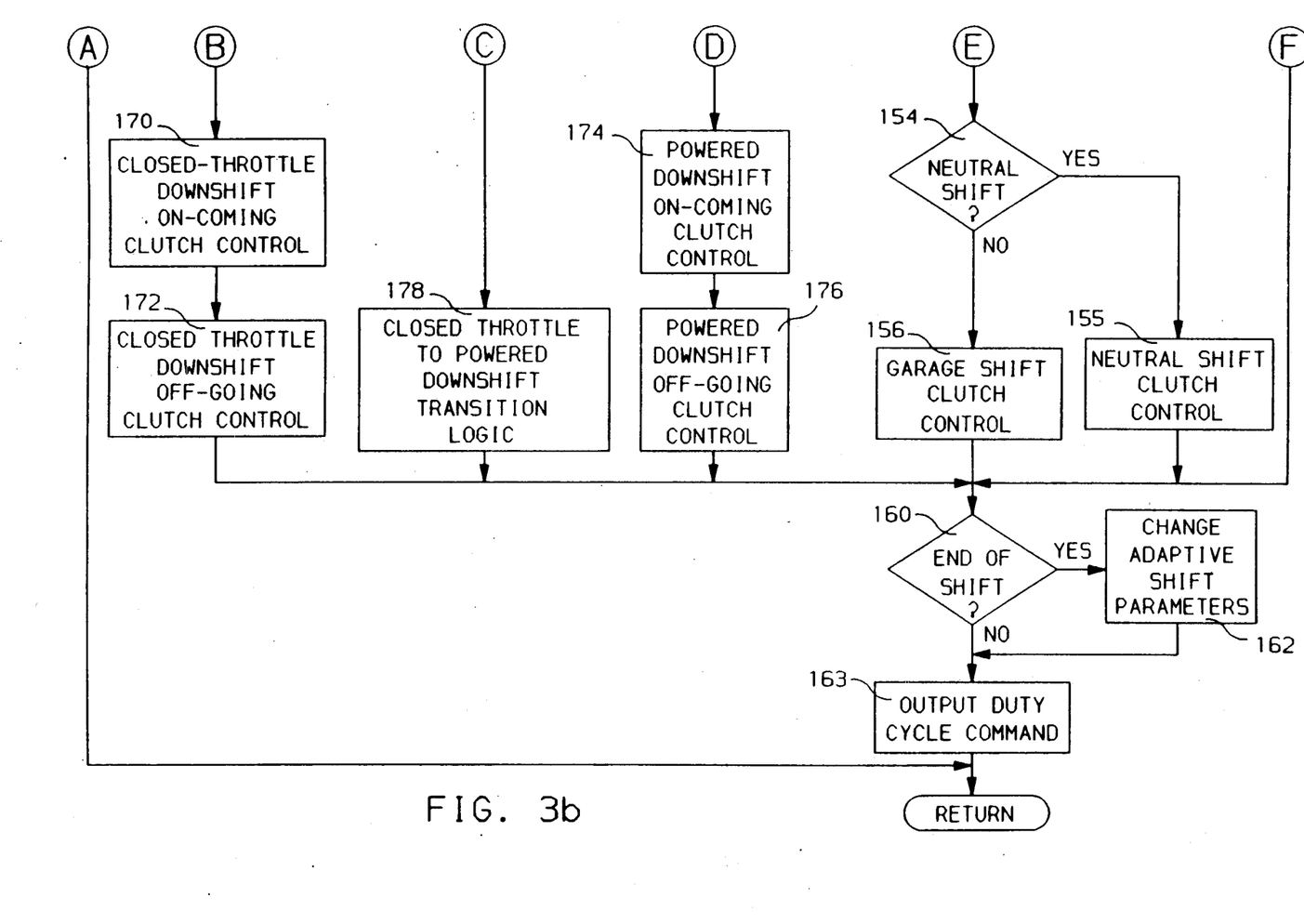

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
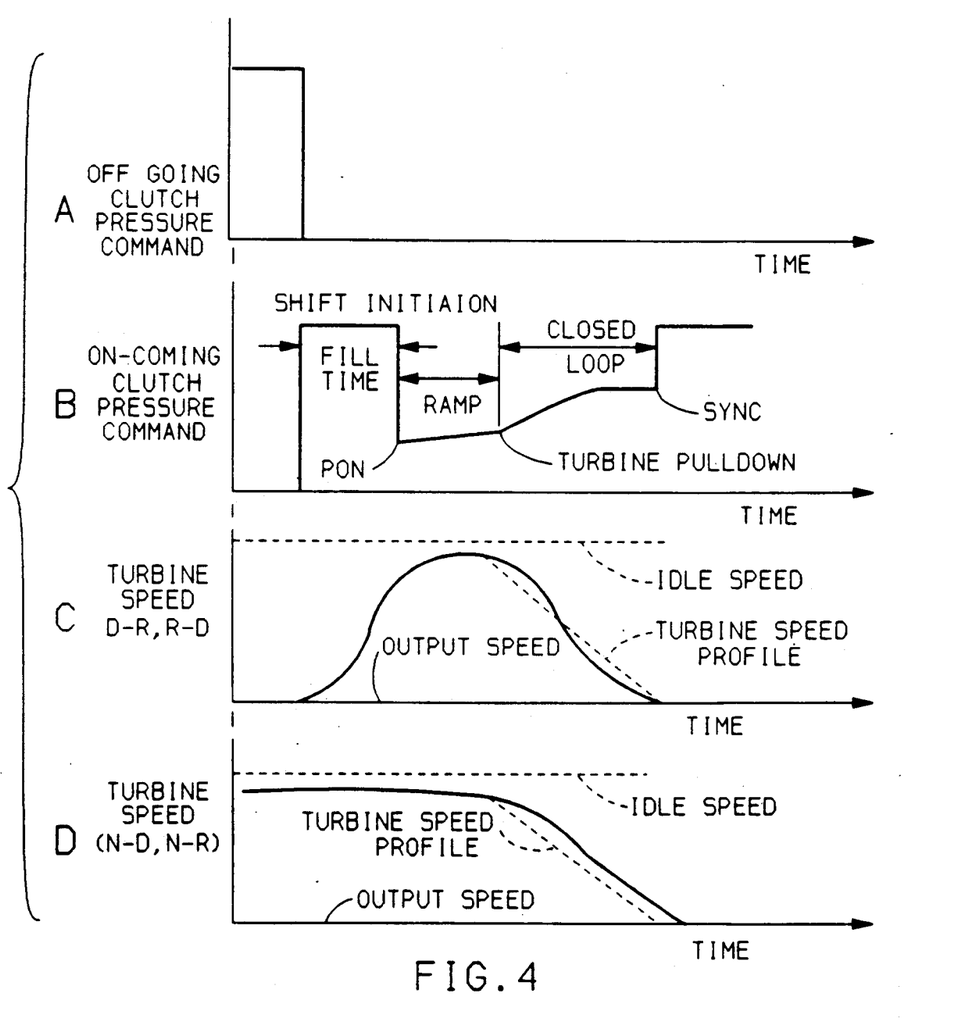
FIG. 4, graphs A, B, C and D illustrate off-going pressure command, on-coming pressure command, turbine speed for a direction changing shift, and turbine speed for a shift from neutral, respectively, for garage shifts according to the invention.

Garage shifts occur in two main categories, low speed (below about 60 RPM output speed) and high speed. In each category, it is useful to separately consider directional change, i.e., forward to reverse or reverse to forward, and nondirectional change. FIG. 4 is directed to the low speed category and illustrates the off-going pressure command in graph A, the on-coming pressure command in graph B, the turbine speed profile for directional change in graph C, and the turbine speed profile for nondirectional change in graph D. For the case of directional change, the transmission is initially in either forward or reverse so that both turbine speed and output speed are low or zero, the zero speed condition being represented in graph C. Upon shift initiation, the off-going pressure command is set to zero to exhaust the off-going clutch. At the same time, the on-coming pressure command is set to maximum for a fill time to fill the clutch cavity and prepare that clutch for the assumption of torque capacity. At the conclusion of the fill time, the on-coming pressure command is set to a predetermined pressure Pon and then is increased in ramp fashion. In the meantime, the release of the off-going clutch allows the turbine speed to float up to a value near engine idle speed. When the on-coming clutch starts to engage, the turbine speed is pulled down. When the turbine speed reaches a set value, such as 25 RPM less than its maximum speed since shift initiation, turbine speed pulldown is detected. This pulldown detection triggers a closed-loop control of the on-coming clutch. The closed-loop control applies pressure to the clutch in a manner to control the turbine speed to a calculated profile. The profile, as shown by a dashed line, is a straight line connecting the turbine speed at the time of pulldown detection with a target speed which, in the case of graph C, is zero. The profile slope is calculated to accomplish the speed change within a preset time. This action smoothly and quickly engages the on-coming clutch. When the targeted zero speed (or synchronization) is detected a set number of times, the pressure command for the on-coming clutch is increased to maximum value to complete the shift.

Graph D of FIG. 4 shows the turbine speed for a nondirectional change shift at a low output speed. Specifically, the shift is from neutral to drive (N-D) or neutral to reverse (N-R). Since the transmission is already in neutral, there is no off-going clutch to release and the turbine speed is already at or near engine idle speed. The operation of the on-coming clutch is essentially the same as in the directional case, described above, and the turbine speed is decreased to the target speed by action of the closed-loop control to closely follow the turbine speed profile.

Figure 5:
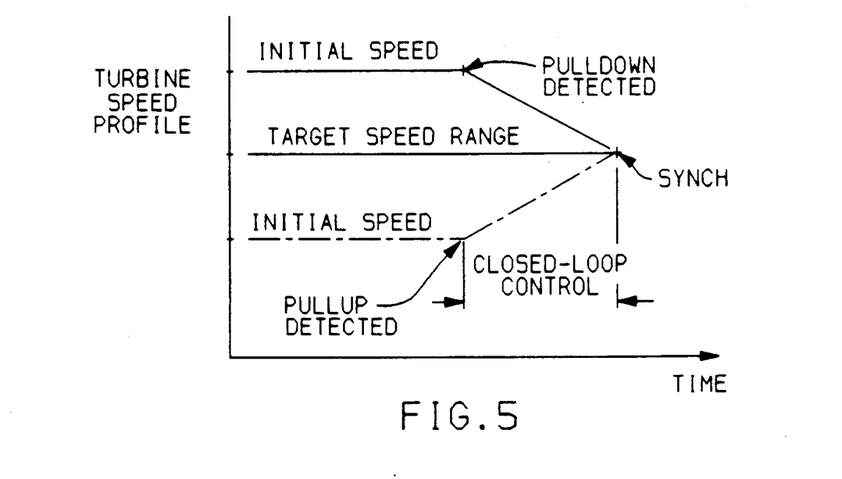
FIG. 5 is a graph of turbine speed profile for a high speed nondirectional change garage shift, according to the invention.

FIG. 5 shows turbine speed for two cases of high speed nondirectional change shifts. In a shift from neutral, the target speed of the turbine (synchronous speed) is the product of the output speed and the speed ratio of the target range. If the turbine speed is higher than the target speed, as shown by a solid line, turbine speed pulldown will occur when the on-coming clutch assumes capacity during the ramp period. On the other hand, turbine speed pullup will occur if the turbine speed is below the target speed, as shown by a broken line. Pullup is defined as the increase of turbine speed by a set amount over the turbine speed at the time of shift initiation. Thus, the system logic must accommodate the detection of both pullup and pulldown and must correctly determine which one merits a response for a given shift. The on-coming clutch operates substantially as in the FIG. 4 example. At the onset of the closed-loop period, the turbine speed profile is calculated as a line having a slope sufficient to bring the turbine speed to the target speed within a preset time. The closed-loop is terminated and full pressure is applied to the clutch when the turbine speed is synchronous with the target speed for several consecutive control loops.

Figure 6:
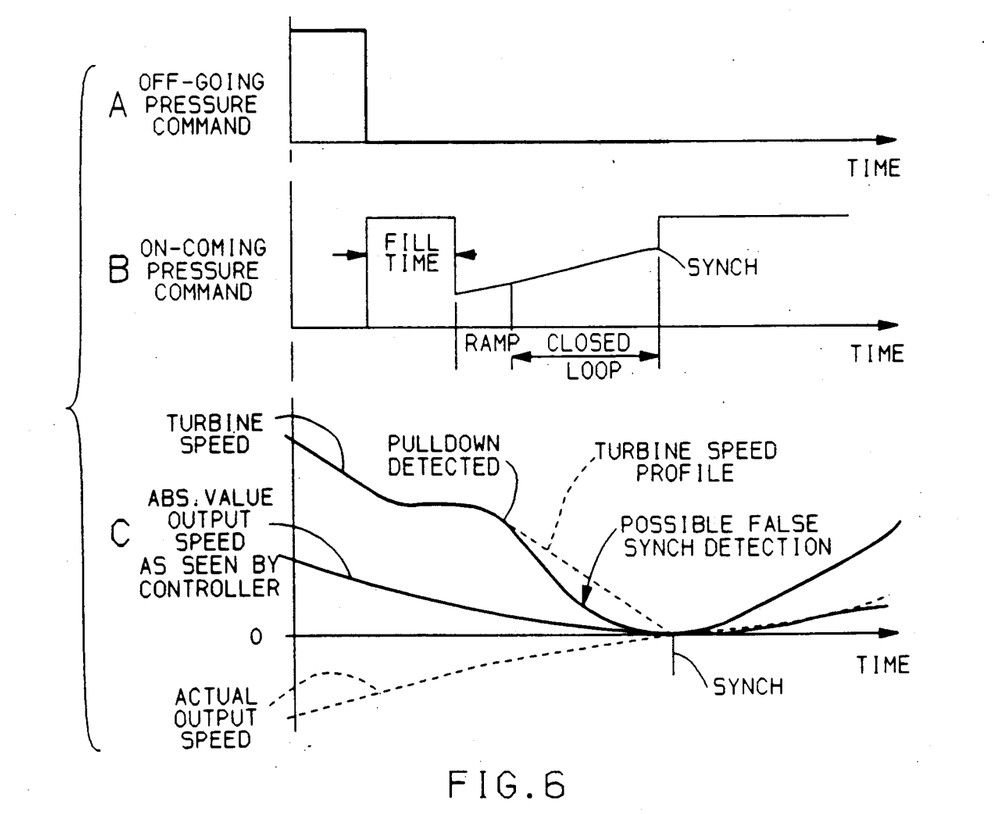
FIG. 6, graphs A, B and C, illustrate off-going and on-coming clutch pressure commands and transmission speeds, respectively, for a high speed directional change garage shift, according to the invention.

High speed directional change shifts use the same type of clutch control as the other garage shifts but require special treatment in the detection of synchronization. As shown in FIG. 6, graphs A and B, the off-going clutch is released when the shift is initiated and the on-coming clutch pressure command goes through periods of fill, ramp, closed-loop control and finally, maximum pressure when synchronization is detected. Graph C shows the turbine and output speeds for a shift from reverse to drive. Actual output speed is shown by a dashed line and goes from negative to positive as the shift is made. The speed signal, however, is an absolute value so that, as shown by a solid line, the speed appears to the controller to be positive. This creates an ambiguity if the synchronization is detected in the same manner as the other shifts, i.e., the turbine speed equals the product of the output speed and the speed ratio of the target range. This point would occur prematurely when reverse speed is substantial; engaging the on-coming clutch at that point would cause an abrupt stop. This problem is avoided by targeting the turbine speed profile to zero speed (since the output speed must pass through zero speed to reverse direction) and defining synchronization to require both turbine speed and output speed to be near zero. When the sync condition is detected for a set number of consecutive control loops, the full on-coming pressure command is applied to complete the shift.

Figure 7:
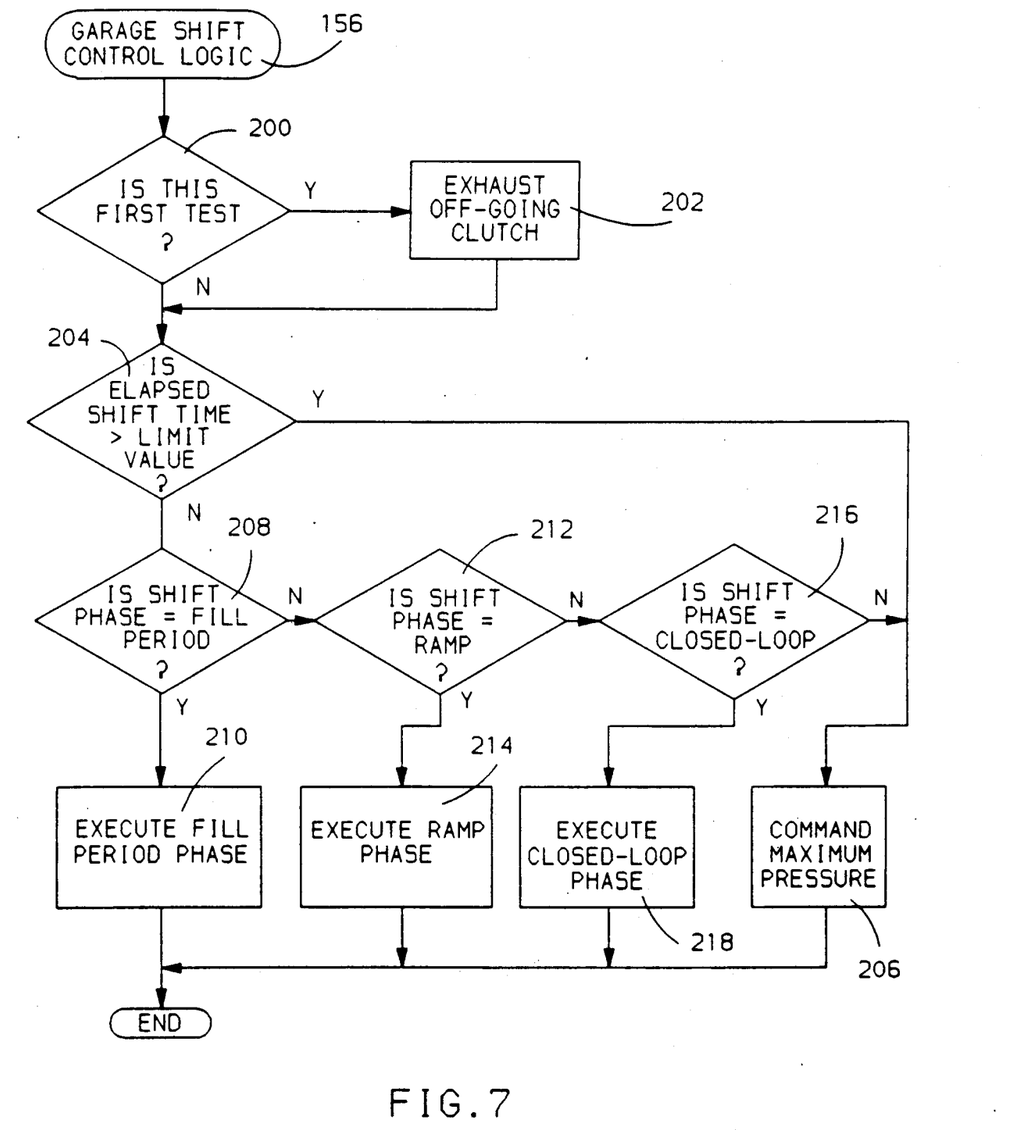
FIGS. 7, 8, 9 and 10a-10b are flow diagrams of the clutch control logic according to the invention.

FIGS. 7, 8, 9 and 10a–10b are the flow diagrams representing the garage shift clutch control logic of block 156 in FIG. 3. In FIG. 7, if it is the first time through the loop <200>, the off-going clutch (if any) is exhausted <202>. The remainder of the logic deals with the on-coming clutch. If the time since shift initiation is greater than a limit value <204>, the maximum pressure is commanded <206>. Then if SHIFT PHASE equals FILL PERIOD <208>, the Fill Period phase is executed <210>. If SHIFT PHASE equals RAMP <212>, the Ramp routine is run <214>. If SHIFT PHASE is set to CLOSED-LOOP <216>, the Closed-Loop program is executed <218>. If SHIFT PHASE is none of the above, the maximum pressure is commanded <206>.

Figure 8:
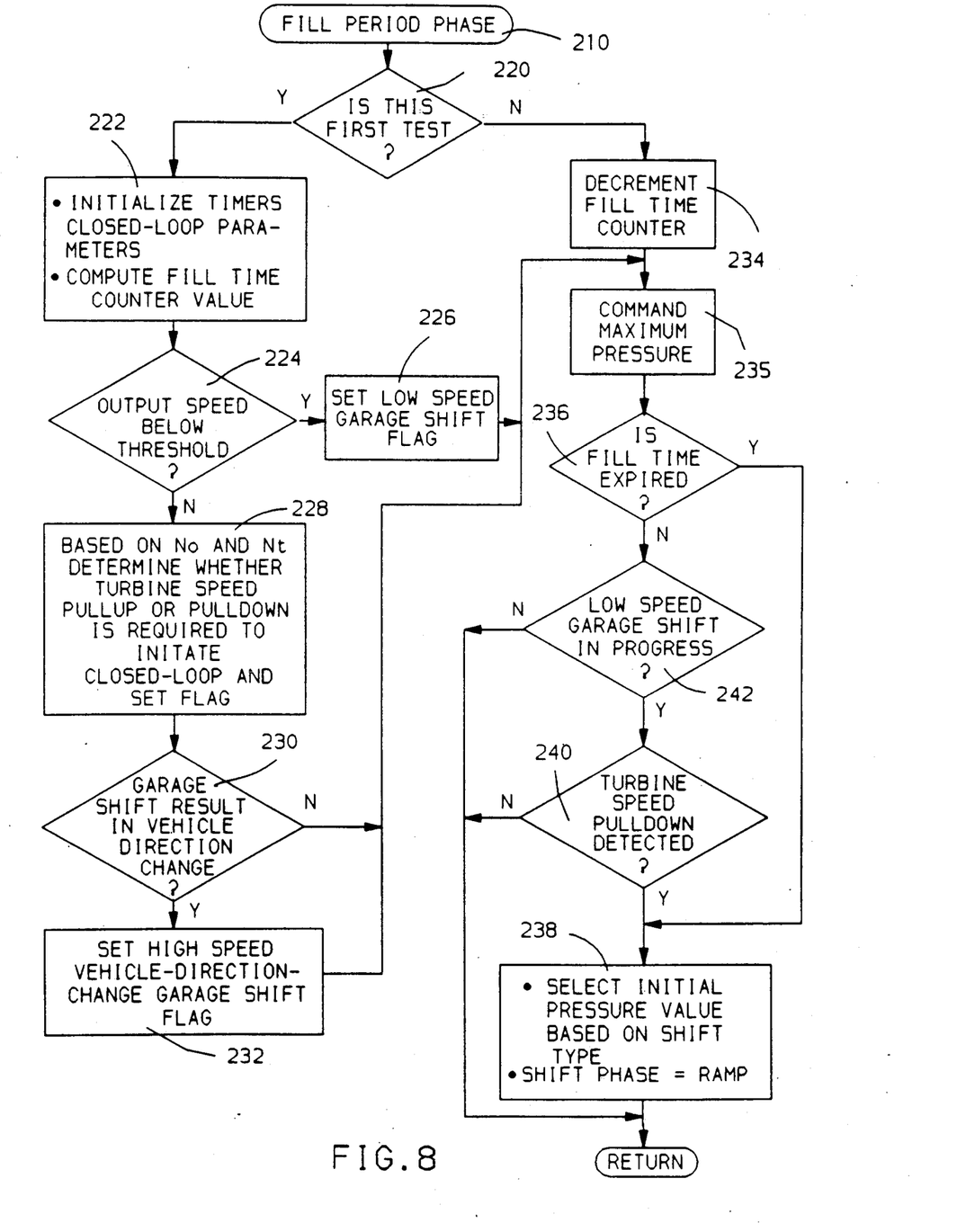

The Fill Period phase is shown in FIG. 8. If it is the first time through this routine <220>, timers and closed-loop parameters are initialized and the fill time value is computed <222>. Then, if the output speed is below a threshold <224>, a low speed flag is set <226> and the program continues to a maximum pressure command <235>. If the output speed is not below the threshold <224>, it is determined whether a pullup or pulldown detection is necessary based on turbine speed and output speed, and a flag is set accordingly <228>. If a vehicle direction change is involved in the shift <230>, a DIRECTION CHANGE flag is set <232> and the maximum pressure is commanded <235>. Referring to the first test block 220, if it is not the first test, the fill time counter is decremented <234> and the maximum pressure is commanded <235>. If the fill time has expired <236>, an initial pressure value is selected based on shift type and SHIFT PHASE is set to RAMP <238>. Then the program control returns to the main loop. However, in the event that the fill time has not expired <236> and turbine speed pulldown occurs <240> when the low speed flag is set <242>, block 238 is executed to initialize the pressure and set SHIFT PHASE to RAMP.

Figure 9:
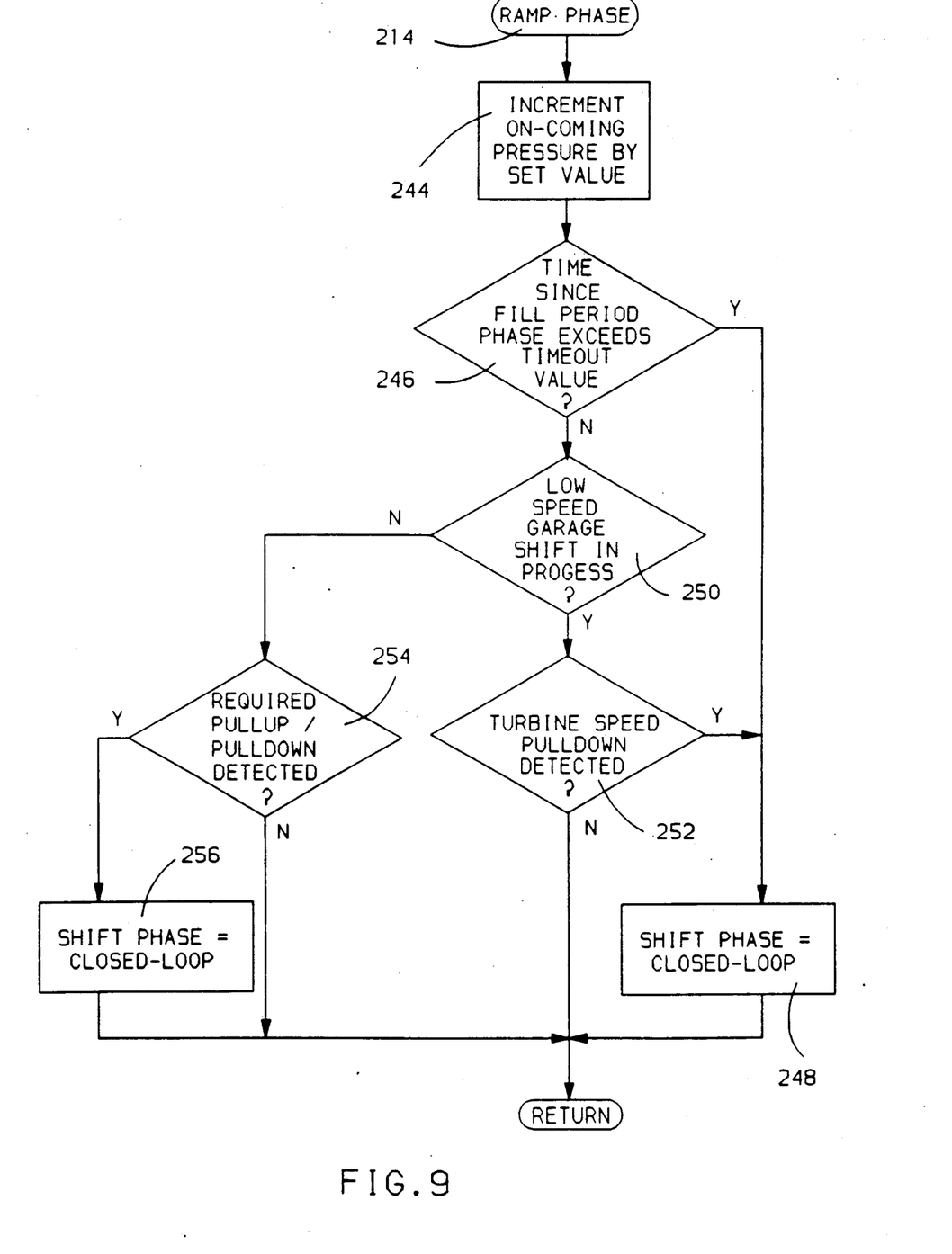

FIG. 9 shows the diagram for the Ramp phase 214. Starting at the selected initial pressure value, the pressure is incremented by a set value <244>. If the time since the fill period phase exceeds a timeout value <246>, SHIFT PHASE is set to CLOSED-LOOP <248>. If the timeout value is not exceeded, the low speed flag. is set <250> and pulldown is detected <252>, SHIFT PHASE is set to CLOSED-LOOP <248>. If no pulldown is detected <252>, the program returns to the main loop. If the low speed flag is not set <250>, and the required pullup or pulldown is detected <254>, SHIFT PHASE is set to CLOSED-LOOP <256>.

Figure 10A:
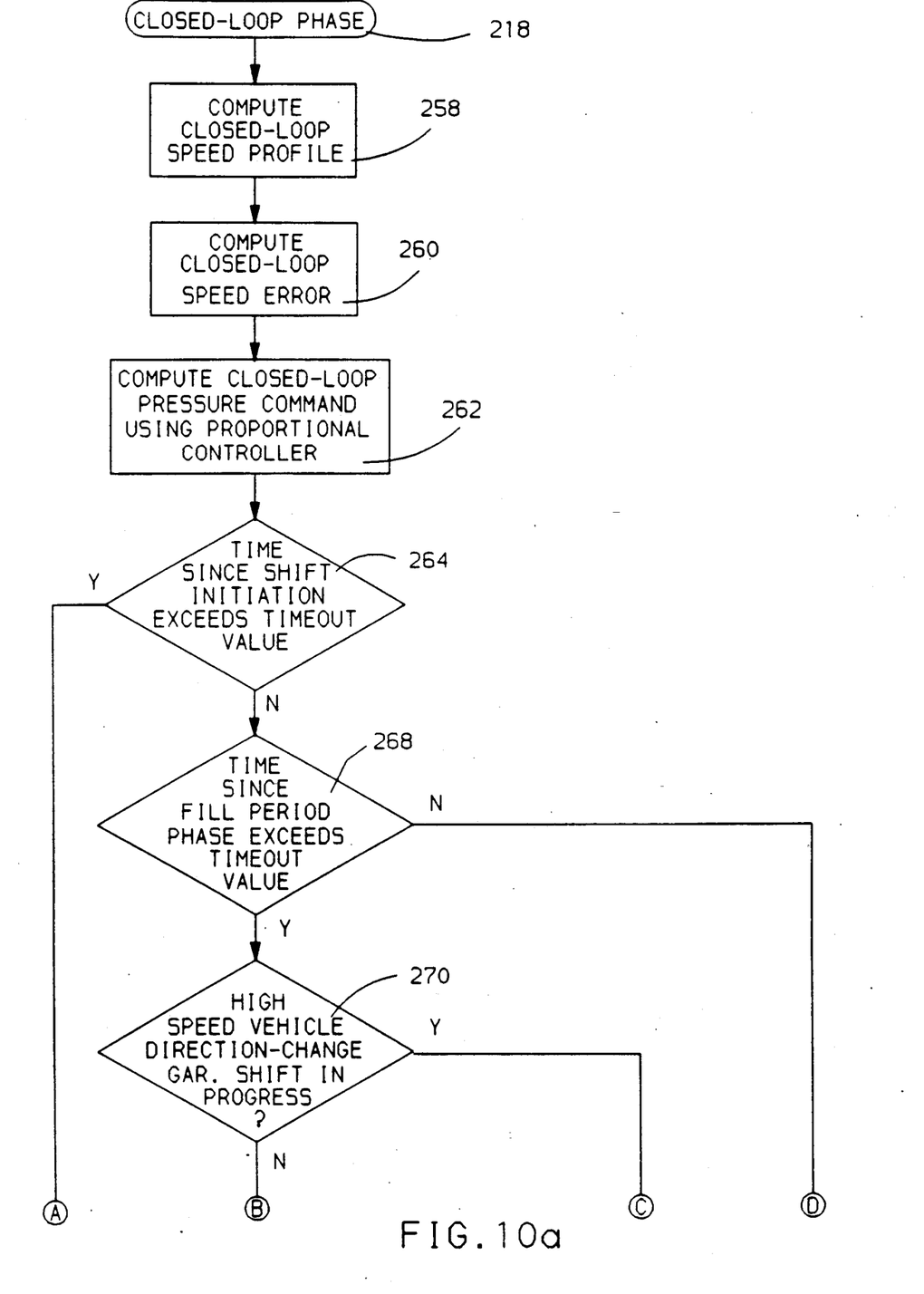
Figure 10B:
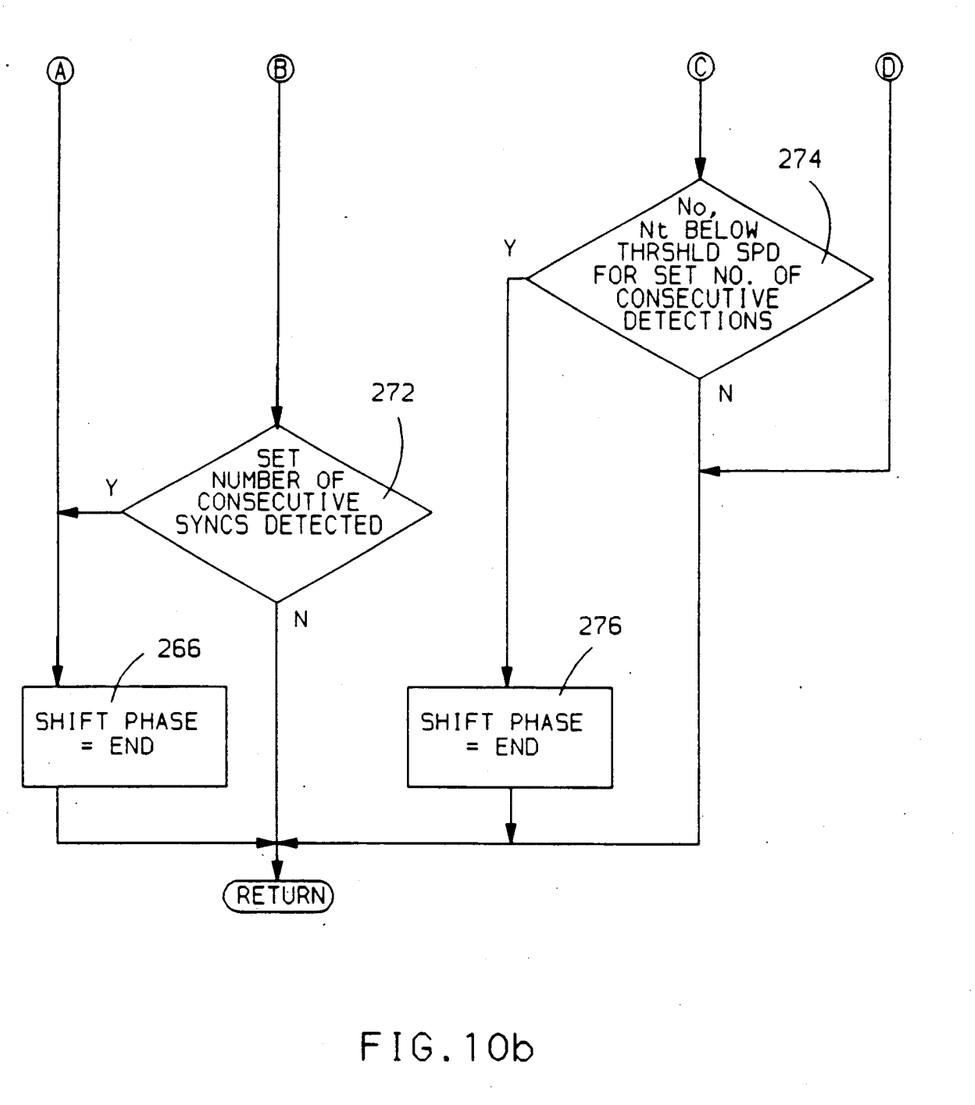

The Closed-Loop phase 218 is shown in FIG. 10. The closed-loop speed profile is computed <258> to determine a desired turbine speed, the speed error is computed from the measured and desired turbine speeds <260>, and the closed-loop pressure command is computed from the error using a proportional controller <262>. If the time since shift initiation exceeds a timeout value <264>, SHIFT PHASE is set to END <266>. If there is no timeout <264> and the time since the fill period does not exceed another timeout value <268>, the control flows to the main loop. If there is a timeout in block 268 and the HIGH SPEED DIRECTION CHANGE flag is not set <270>, SHIFT PHASE is set to END when a set number of consecutive syncs have been detected <272>. In this case, the syncs are detected by the turbine speed attaining the product of the output speed and the speed ratio of the target range. If the HIGH SPEED DIRECTION CHANGE flag is set <270>, sync is detected by turbine speed and output speed being below near zero threshold. If a set number of syncs are detected in consecutive loops <274> SHIFT PHASE is set to END <276>; otherwise the program continues to the main loop.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, in which garage shifts to a target range are carried out by the controlled engagement of on-coming fluid pressure operated torque transmitting means associated with the target range, and further having turbine and output speed sensing means, a method of electronically controlling the torque transmitting means to effect a garage shift to a target range comprising the steps of:
   defining a turbine speed profile beginning at an initial turbine speed and ending at a target speed at which a shift is substantially complete, and
   effecting a closed-loop control by controlling the on-coming pressure to control the turbine speed to the profile, and terminating the closed-loop control when the turbine speed reaches the target speed.

2. The invention as defined in claim 1 including the steps of:
   detecting a turbine speed event indicative of beginning engagement of the on-coming torque transmitting device, wherein detecting the speed event comprises detecting turbine pulldown, and
   initiating the closed-loop control period when the turbine speed event is detected.

3. The invention as defined in claim 1 including the steps of:
   detecting a turbine speed event indicative of beginning engagement of the on-coming torque transmitting device, wherein the speed event is detected by detecting turbine pulldown when the turbine speed is above the target speed and by detecting turbine pullup when the turbine speed is below the target speed, and
   initiating the closed-loop control period when the turbine speed event is detected.

4. The invention as defined in claim 1 wherein the closed-loop control is initiated by a turbine speed change event including the steps of:
   when the turbine speed is greater than the target speed, detecting the event by sensing a decrease of turbine speed from the maximum turbine speed since shift initiation by a threshold amount, and
   when the turbine speed is less than the target speed, detecting the event by sensing an increase of turbine speed by a threshold amount over the turbine speed at the shift initiation.

5. The invention as defined in claim 1 wherein the step of determining a target speed comprises calculating the product of output speed and the speed ratio of the target range.

6. The invention as defined in claim 1 wherein for a direction-changing shift requiring the release of an off-going torque transmitting device, the additional steps of:
commanding release of the off-going torque transmitting device at shift initiation, and
terminating the closed-loop control when both turbine speed and output speed are below a preset threshold.

7. The invention as defined in claim 1 wherein shifting between forward and reverse involves the release of an off-going torque transmitting device, and wherein the turbine speed is initially near zero, including steps of:
exhausting pressure from the off-going torque transmitting device to permit the turbine speed to increase to a maximum turbine speed,
when the on-coming device begins engagement, detecting turbine speed pulldown when the turbine speed decreases by a set amount below the maximum turbine speed, and
initiating the closed-loop control upon detection of turbine speed pulldown.

* * * * *